(12) United States Patent
Kanter et al.

(10) Patent No.: US 9,696,412 B2
(45) Date of Patent: Jul. 4, 2017

(54) SYSTEM AND METHOD FOR MEASURING OPTICAL DELAY USING A SINGLE PHOTON DETECTOR WITH PULSED OPTICAL SIGNALS

(71) Applicants: Gregory S. Kanter, Chicago, IL (US);
Daniel R. Reilly, Chicago, IL (US)

(72) Inventors: Gregory S. Kanter, Chicago, IL (US);
Daniel R. Reilly, Chicago, IL (US)

(73) Assignee: Nucript LLC, Evanston, IL (US)

( * ) Notice: Subject to any disclaimer, the term of this patent is extended or adjusted under 35 U.S.C. 154(b) by 278 days.

(21) Appl. No.: 14/600,112

(22) Filed: Jan. 20, 2015

(65) Prior Publication Data

US 2016/0209498 A1 Jul. 21, 2016

Related U.S. Application Data

(60) Provisional application No. 61/929,925, filed on Jan. 21, 2014, provisional application No. 61/599,531, filed on Feb. 16, 2012.

(51) Int. Cl.
*G01S 7/486* (2006.01)
*G01S 17/10* (2006.01)
*G01S 7/487* (2006.01)

(52) U.S. Cl.
CPC .......... *G01S 7/4865* (2013.01); *G01S 7/487* (2013.01); *G01S 17/10* (2013.01); *G01S 17/107* (2013.01)

(58) Field of Classification Search
CPC .................. H04L 7/00; H01L 31/107
See application file for complete search history.

(56) References Cited

U.S. PATENT DOCUMENTS 9,213,085 B2* 12/2015 Kanter ............... G01S 7/4808
2012/0294625 A1* 11/2012 Dynes ............... H04L 7/0008
398/155
2014/0321862 A1* 10/2014 Frohlich ............. H01L 31/107
398/154

* cited by examiner

*Primary Examiner* — Luke Ratcliffe
(74) *Attorney, Agent, or Firm* — Nadya Reingand

(57) ABSTRACT

A system and method for measuring the temporal delay an optical signal experiences along a path is provided it uses single photon sensitive detectors and multiple optical pulse rates. The multiple optical pulse rates are chosen to allow each to be isolated in post-processing even if only a single detector is employed. The detectors can be time-gated at a repetition rate synchronized but different from the optical pulse rates, including the use of a pulsed-pump up-conversion detector. The pulse rate choice allows improved performance, including an extension of the unambiguous temporal delay range. The ability to isolate the pulse rates can also be used for measuring multiple path delays simultaneously or for spectrally resolving path characteristics without requiring the use of spectral filtering. The post-processing function can be segmented to include an initial signal quality estimation step so further processing can be aborted if it is unlikely to succeed.

20 Claims, 6 Drawing Sheets

US 9,696,412 B2

SYSTEM AND METHOD FOR MEASURING OPTICAL DELAY USING A SINGLE PHOTON DETECTOR WITH PULSED OPTICAL SIGNALS

CROSS-REFERENCE TO RELATED CASES

The present Application claims priority to the US Provisional Application No. 61/929,925 filed on Jan. 21, 2014 entitled "System and method for measuring the range and velocity of an object using a pulsed optical signal and gated photon detector", and also the current Application is a Continuation-in-part of US Nonprovisional application No. 13/768,652 filed on Feb. 15, 2013 entitled "System and method for measuring the phase of a modulated optical signal" which claims priority to US Provisional Application No. 61/599,531 filed on Feb. 16, 2012.

STATEMENT REGARDING FEDERALLY SPONSORED RESEARCH OR DEVELOPMENT

The United States Government has certain rights to this invention pursuant to contract W911NF-13-C-0028 from the US Army.

FIELD OF THE INVENTION

The present invention relates to measuring small quantities of light and the temporal delay the light experiences when propagating through a channel. Such a function can be applied to various applications including for example optical ranging, optical imaging, remote vibration measurements, spectroscopy measurements, and other optical instrumentation.

BACKGROUND

Optical signals do not diffract as much as radio frequency (RE) signals. This makes them useful for a variety of ranging and radar-like imaging applications using relatively small apertures. One common light detection and ranging (lidar) method is a phase-shift method here an optical signal is modulated by a RF frequency, and the phase of the RF frequency of the return optical signal (the return optical signal is the signal that returns to the transceiver after bouncing off an object to be measured) is measured thus giving information about the distance to the object. This information is equivalent to a temporal delay measurement of the optical signal, as distance and time are related by the speed of light. The distance to the object is known to within some unambiguous range that in this case is proportional to the inverse of the RF frequency. The phase can be monitored over time (a phase change with respect to time is equivalent to an RF frequency shift) to determine the speed of the object with respect to the transceiver.

Avalanche photodiodes (APDs) are sometimes used as the optical detector since they have a large internal gain making them sensitive to the small levels of return light typically encountered, especially when the transceiver and object are far apart. The electrical signal from the APD can be mixed with an RF local oscillator in a mixer to translate the received signal frequency down to a level where signal processing can more easily be performed.

It would be advantageous in terms of sensitivity to use a single photon sensitive detector (SPD). However, such detectors have outputs that are not generally linear with respect to the input optical signal (for instance they may have binary digital outputs), thus a traditional mixer is not necessarily a preferred component for processing the SPD output. APD's can be operated in a SPD mode (the Geiger mode) where they are sometimes used in lidar to measure the time-of-flight of a pulse from a transmitter to the object and back again because of their very high sensitivity to small levels (single photons) of reflected light. The time-of-flight can be translated into distance to the object since the speed of light is constant. The optical pulse repetition rate in a time-of-flight scheme is typically quite low, making it difficult to perform velocity measurements or fast measurements suitable for imagine when using SPDs. The low pulse rate is due to a variety of factors, including the desire to have a long range over which the distance to the object can be measured unambiguously.

A method of measuring return optical signals that makes use of a time gated photon detector and a pulsed optical source with an optical pulse rate related to but unequal to the gate rate is described in provisional patent 13768652 "System and method for measuring the phase of a modulated optical signal." The technique of using a related but unequal rate for the temporally-gated photon detector and for the optical pulse rate offers various advantages including a capability for high speed and high resolution measurements using practical components. The electronics required in this configuration can be simpler than other techniques since the digital output from the SPD can be processed without attempting to determine the exact time of the breakdown with high resolution (e.g. no high resolution time-to-digital converter is required). Since the time of the breakdown is localized by the temporal response of the time-gated detector and this temporal response can be narrower than typical detector jitter, this method can be used to determine the temporal locations of the single photon detection events with high resolution. One technique for generating very narrow time gates include temporally gating the SPD (U.S. patent application Ser. No. 13/768,652).

Another type of SPD uses a nonlinear nonlinear interaction with an optical pump to change the wavelength of a desired signal. This type of SPD is sometimes called an up-conversion SPD, and can be useful for changing the wavelength of the signal to one that is well matched to high quality SPD technology. It is possible to pulse the optical pump ("Up-conversion single-photon detector using multi-wavelength sampling techniques." Optics express 1.9.6 (2011): 5470-5479), and this would produce a kind of time-gated SPD.

Lidar systems operate such that the distance to an object (or equivalently the time delay to and from the object) is measured to within some unambiguous distance. In typical time-of-flight lidar this distance is set by the pulse repetition rate, forcing a low repetition rate for objects that are far away. The lower repetition rate can be inconvenient for many reasons including longer measurement times and higher peak power levels. Some methods to extend the unambiguous range have been developed, including modulating the pulse sequence with a pseudo-random code ("Photon Counting Pseudorandom Noise Code Laser Altimeters," Proc. SPIE Vol. 6771, X. Sun el. al., 2007). Adding, such modulation can add cost and complexity to the system.

While an improvement to the state of the art, this prior art can be expanded upon. What is needed is a high speed optical signal delay measurement system that is capable of operating over a wide range of received power levels, can obtain high resolution measurements with large unambiguous ranges in short measurement times, can measure multiple optical signals with a single or limited number of SPDs, and can work with a variety of SPD technologies. It is beneficial if the processing can be performed in real time, possibly employing an adaptive method to determine the measurement interval on which to process the data, including the option of stopping the data processing if the data quality is determined to be too inaccurate to expect a positive result thus conserving power and processing time. The raw data can also be stored and post-processed at a later time using multiple methods.

SUMMARY

The invention herein measures the temporal delay of multiple pulsed optical signals of differing pulse rate using a single photon sensitive detector (SPD). According to the invention a SPD with suitable subsequent signal processing can distinguish between the multiple received pulsed optical signals. In one embodiment the detection efficiency of a photon detector is gated in time at a frequency $f_G$ to detect a modulated optical signal. The modulated optical signal is sent from a transceiver to an object, and the small portion of the optical signal that reflects off the object and returns to the transceiver is measured by a SPD. The modulated optical signal can be composed of a series Q different optical pulse rates, where Q is an integer greater than 1, at a given transmitter pulse repetition frequency $f_{L,Q}$. The optical pulse temporal full-width at half maximum (FWHM) is characterized by a time $\tau_{p,Q}$. The pulses could come from a gain switched laser diode, a mode-locked laser, a CW laser that is pulse-carved using a modulator, or other pulsed optical source. The multiple optical pulse rates are used, for instance, to extend range ambiguities. They can be transmitted sequentially or simultaneously. The ability to distinguish multiple pulse rates can be used for other purposes as well, such as for measuring the distance to multiple locations using a single SPD.

In one embodiment the received signal is detected using a SPD that is time gated so that the detection efficiency varies in time. Such a time gating can be realized by electrically gating APDs into Geiger mode or by using a nonlinear frequency conversion stage that is pumped by a pulsed pump source and detecting the frequency converted photons with an SPD. The nonlinear frequency conversion stage could be realized by using sum-frequency generation (SFG) between the pulsed pump and signal to convert the signal to a new wavelength that can be subsequently measured by a high efficiency SPD. The detection time window where high efficiency photon detection occurs can be characterized by its FWHM $\tau_g$. A detector based on nonlinear frequency conversion stage, also known as nonlinear up-conversion, pumped by a pulsed pump can have the advantage that the detection window can be made extremely short, such as 10 ps, which is difficult to do via electronics. A shorter detection window can help localize the detection events to a resolution better than the natural jitter of the detector output.

The frequency at which an SPD is time gated $f_G$, is related to the Q distinct optical pulse rates the SPD may receive, $f_{L,Q}$, by $f_{L,Q}/f_G = N_Q/D_Q$ where $N_Q$ and $D_Q$ are relatively prime numbers and $D_j \neq D_Q$ for $j \neq Q$. A digital signal processor (DSP) collects the detected output signal from the gated SPD. The DSP can process the SPD data into histograms, where $D_Q$ corresponds to the number of bins in the histogram formed by collecting the aggregate photon counts of every $D^{th}$ gate over some histogram measurement interval Pulse rate $t_{hist}$. Pulse rate $f_{L,Q}$ can be easily evaluated using a histogram of $D_Q$ bins. This allows any of the pulse rates to be easily isolated in post-processing, even if the pulse rates are transmitted simultaneously. The data from the optical pulses can be used to find the temporal delay from the transceiver to the object and back.

The measurement interval $t_{hist}$ is a design parameter that can be changed depending on the user needs, including choosing $t_{hist}$ long enough to receive a suitably high number of photon counts to localize the measured delay with acceptable resolution. Histograms can be evaluated individually or multiple histograms can be processed jointly in order to find information about the temporal delay. The raw histograms may be re-ordered such that the re-ordered histogram is related to an equivalent time representation of the temporal response function of the convolution of the optical pulse width and the temporal detection efficiency profile of the gated SPD. After recording a histogram, the system re-orders the histogram bins so they are in proper temporal order, using the mapping $bin_i = mod(b \cdot N, D)$ where b is the original bin number (where b is in the set $\{0-(D-1)\}$) and i is the re-ordered bin number in the set $\{0-(D-1)\}$. The histogram bins can thus be viewed as a sampling in equivalent time, with the histogram bins separated by a temporal resolution of $1/(D \cdot f_{L,Q})$. The magnitude of the counts in each bin are related to the light intensity detected at that equivalent time. The location of the peak of the histogram, where the peak location can be located in-between the discrete bins by evaluating the relative counts in the re-ordered histogram bins by applying a fitting function or correlation function to extrapolate the peak temporal location to a resolution $<1/(D \cdot f_{L,Q})$, is then related to the distance of the object within some unknown number of unambiguous ranges. For the fitting function to work optimally it is useful if at least 3 of the histogram bins have count levels elevated above the background count level, these 3 or more bins forming a sampling of a pulse-like function on the temporally re-ordered equivalent time histogram.

The system can be used to measure the distance of an object to the transceiver by converting the measured temporal delay into an equivalent distance since the speed of light is constant. When using a single optical pulse rate with no additional modulation the distance to the object is determined to an integer number of unambiguous ranges of $R_{unambiguous} = c/(2 \cdot f_{L,Q})$. The range ambiguity can be improved by processing data at more than one pulse repetition rate and choosing a distance that is consistent with the multiple pulse rates. Assuming $f_g$ does not change, which is desirable from the standpoint of the receiver design since fixed frequency components like fixed filters can be used in the system, this is equivalent to changing, the values of $D_Q$ and possibly $N_Q$. In some cases, for instance if a gain switched laser diode is used for the pulsed light source, then it may be easier to change the optical pulse repetition rate than it is to otherwise modulate the light source. The optical pulse repetition rate can be changed as a function of time so as to time multiplex the transmissions, or multiple repetition rate optically pulsed signals can be simultaneously generated and measured, or some combination thereof. Using multiple temporal segments to transmit different combinations of optical pulse rates can make it easier for a small number of detectors, including the case of a single detector, to process multiple pulse rates with minimal interference. During processing a histogram of bin-length $D_Q$ can be used to evaluate the pulse rate at $f_{L,Q}$. Although each of the Q histograms evaluated individually are able to determine the temporal delay range to an unambiguous temporal delay range of $1/f_{L,Q}$ the data from the Q pulse rates can be being jointly processed to increase the unambiguous temporal delay range to a value >5/$f_Q$ any Q. The unambiguous temporal delay range is extended by determining a common range value that gives a consistent result for the multiple pulse rates. Ideally, the various frequencies are chosen so that a histogram of bin-length of $D_j$ where j≠Q has approximately equally distributed counts in all its bins from an input pulse rate of $f_{L,Q}$, which helps to reduce cross talk between the different pulse rates.

The equivalent time between histogram bins is $1/(D \cdot f_{L,Q})$, it is useful when trying to determine the range via curve fitting that the convolution of the optical pulse width and the temporal detection efficiency curve be long enough that elevate count levels are recorded for 3 histogram bins or more. This allows for a fitting or a correlation function to finely find the temporal location of the equivalent time histogram peak with much higher resolution than the equivalent time spacing between bins thus allowing for high resolution ranging. If the condition $1/(D \cdot f_{L,Q}) < 1.25 \cdot (\tau_{p,Q}^2 + \tau_G^2)^{0.5}$ is satisfied and the optical pulse has a smooth intensity profile transition (such as a Gaussian pulse) then the desired fine temporal resolution can be directly achieved. These conditions should be met for at least two of the optical pulse rates so that multiple pulsed signals are measured with high resolution, allowing for joint processing of the associated detector count statistics to gain significantly more information about the optical delay than using just one of the pulse rates.

The pulsed optical signals can be directed to multiple locations, where at least two pulse rates can be transmitted simultaneously and these two pulse rates are transmitted to two separate locations. A single SPD can be used to measure the distance to both locations. Alternatively the ability to measure multiple pulse rates can be used to obtain spectral information without spectral filtering. Here the optical pulses can be of different wavelength and transmitted to a single location. After detection signal processing can distinguish the relative probability of receiving each of the two (or more) wavelengths without requiring multiple detectors or the use of spectral filtering devices such as a tuneable optical filter. The signal processing can be used to infer information about the spectral characteristics of the path between the transmitter and receiver, including the spectral properties of the reflection from the target. If desired, a switch can bypass the path from the transmitter to the receiver so that the system can be easily and accurately calibrated at the multiple wavelengths.

In another embodiment the SPD can be ungated, with the SPD output evaluated using histograms of distinct temporal durations of $T_{(hist,q)} = 1/f_{L,Q}$, and where $N_Q/(D_Q f_{L,Q}) = C$ for all Q where $N_Q$ and $D_Q$ are relatively prime numbers, $D_j \neq D_Q$ for j≠Q, Q≥2, and C is a constant. In this way the temporal bin resolution of each histogram is $1/(D_Q \cdot f_{L,Q})$. Jointly processing the Q resulting histograms results in an unambiguous range of >5/$f_{L,Q}$. Multiple simultaneously transmitted optical pulse rates can be isolated in post-processing by using such a scheme.

The signal processing algorithms require sonic processing power which is a limited resource. In many cases, a measurement may not lead to a meaningful result since there may not be an object in the beam path that provides a return signal with an acceptable signal-to-noise ratio (SNR). It is possible to perform limited processing in order to determine if the measurement is likely to lead to a positive result, and thus only continue with additional processing if warranted. In one embodiment the processing can simply compare the number of photon counts in a given interval to the background count level. The background count level could for instance be estimated by comparing the number of counts in the histogram bins that have relatively high count levels with the average number of counts in the remaining histogram bins, where the count difference can be attributed to a combination of natural statistical fluctuations and the desired received optical signal. If the number of counts attributed to the received optical signal is determined to be too small (being below some threshold, such as below 20 counts), then the processing may be aborted. If the number of counts attributed to the receive optical pulses is large enough to be considered above the background level, but smaller than the desired threshold number of counts to justify further processing, then more data can be accumulated before processing. A memory inside the processor can store the data so that off-line processing can be performed if the data rate is temporarily too fast for the processor to keep up.

DETAILED DESCRIPTION

In the following description, for purposes of explanation, numerous specific details are set forth in order to provide a thorough understanding of the invention. It will be apparent, however, to one skilled in the an that the invention can be practiced without these specific details.

Reference in this specification to "one embodiment" or "an embodiment" means that a particular feature, structure, or characteristic, described in connection with the embodiment is included in at least one embodiment of the invention. The appearances of the phrase "in one embodiment" in various places in the specification are not, necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
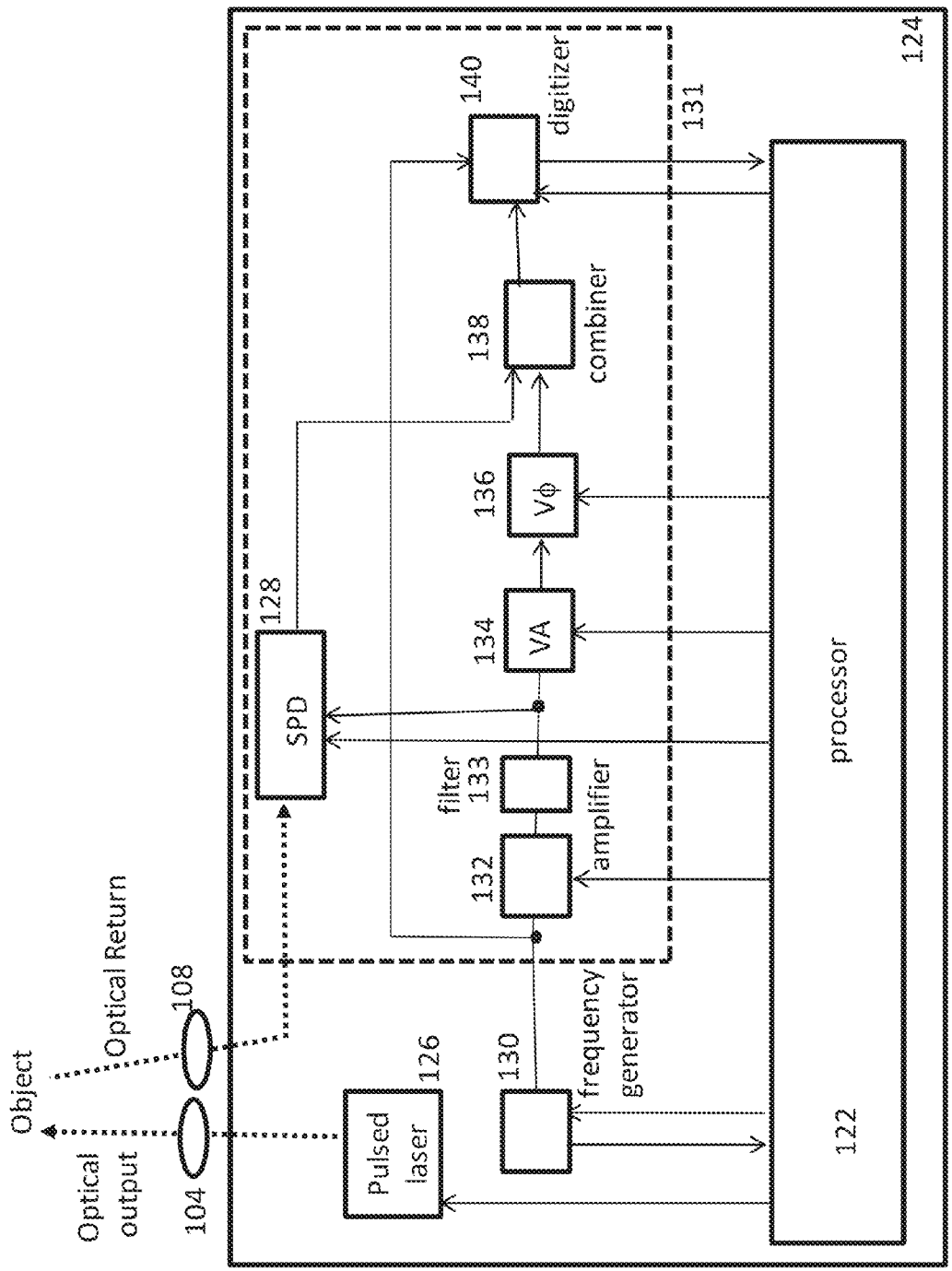
FIG. 1: prior art functional block diagram of a gated lidar system.

FIG. 1 depicts a prior art lidar system 124 which allows for an optical pulse repetition frequency to be locked to, but unequal with respect to, the SPD gate repetition frequency. The system is controlled by a processor 122 that also serves as a digital signal processor (DSP). The gate frequency is controlled by a frequency generator 130 and the optical pulse repetition frequency is controlled by the processor which generates pulses to modulate a pulsed optical source 126 such as a pulsed laser. The optical pulse frequency $f_l$ and detector gate frequency $f_g$ are related by $f_l/f_g=N/D$ by where N and D are relatively prime numbers. The signal from the pulsed laser is transmitted out of a transmit optical antenna 104 and a portion of the signal that reflects off an object is received by the receive optical antenna 108. The received signal is sent to the single photon detection system 131. The single photon detection system consists of a variety of components which together digitize the received optical signal at the single photon level with a gated temporal detection window of width $\sim\tau_g$ and repetition rate $f_g$. In this instance the single photon detection system consists of a SPD 128 such as an APD operating in Geiger mode, an electrical amplifier 132 and filter 133 which generates the electrical gating signal to the SPD, a portion of the gating signal to the SPD being tapped off and controlled in amplitude by a variable attenuator 134 and a variable phase shiner 136 such that when the output signal from the SPD is combined with the amplitude and phase controlled tapped-off gating signal the electrical gate feed through from the SPD is greatly diminished leaving a clear breakdown signal that is subsequently digitized in a digitizer 140 which could be, for instance, a comparator. The various components of the single photon detection system are controlled by the processor in order to operate in the desired single photon counting regime. Other implementation of single photon detection systems could also be used, with the described method being one example.

Figure 2:
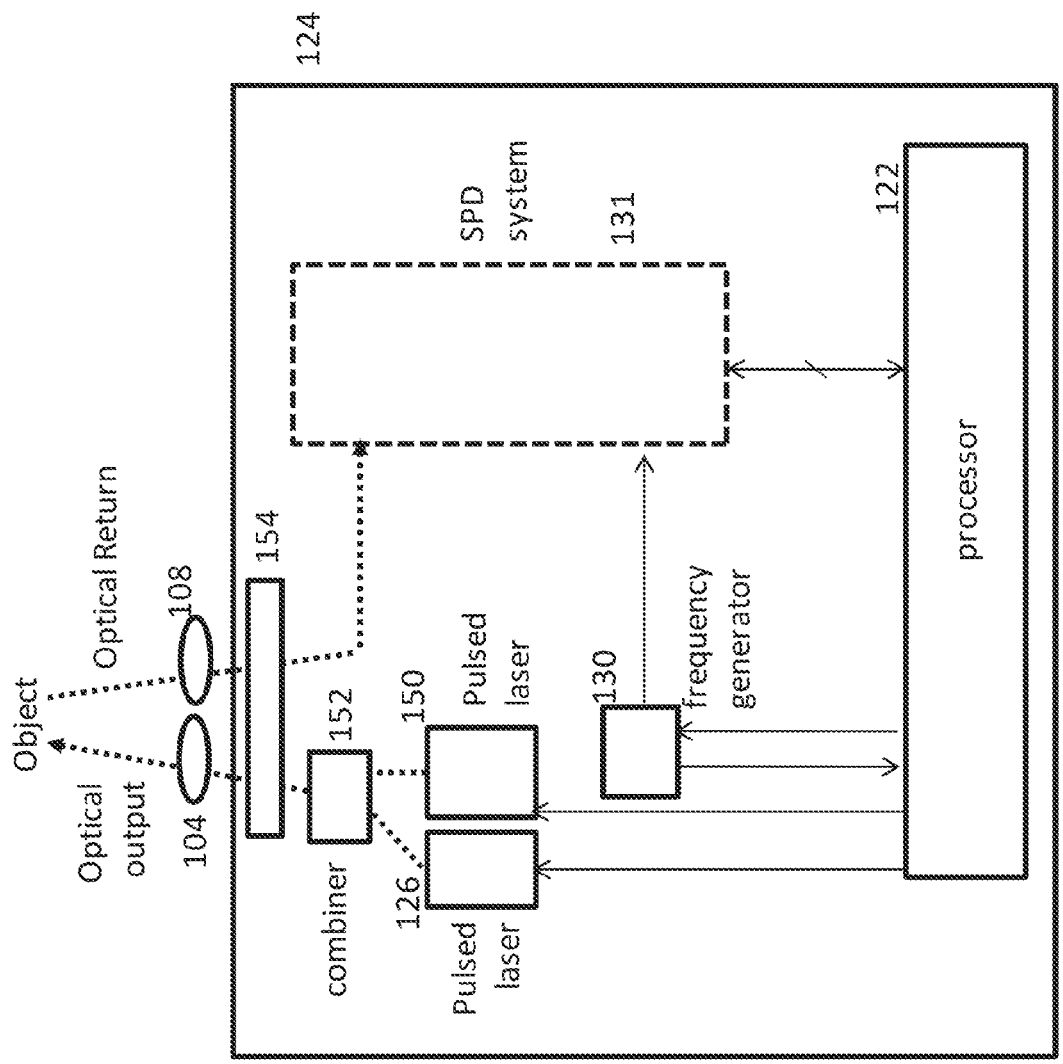
FIG. 2: block diagram of a multi-rate optical pulsed gated lidar system.

One embodiment of the invention is shown in FIG. 2, which has labeling similar to FIG. 1 except for any differing components. In this embodiment there are two pulsed optical sources 126,150 each transmitting pulses at different pulse rates $f_{l,1}$ and $f_{l,2}$, determined by the processor. The frequency at which the SPD is time gated, $f_G$, is related to the Q distinct optical pulse rates the SPD may receive, $f_{l,Q}$, by $f_{L,Q}/f_G=N_Q/D_Q$ where $N_Q$ and $D_Q$ are relatively prime numbers and $D_j \neq D_Q$ for $j \neq Q$. This represents a simple system where the number of distinct optical pulse rates Q=2, although higher Q values are possible. These two optical pulse rates are combined in an optical combiner 152 and transmitted together out the transmitter antenna 104. We note that other means of generating two distinct optical pulse rates could be used.

Without loss of generality, we choose for an example case $f_{l,1}=109.4$ MHz, $D_1=80$, $N_1=7$, $f_{l,2}=88.2$ MHz, $D_2=85$ bins, $N_2=6$, and $f_g$ 1.25 GHz. The breakdown signals from the SPD system 131 represents photon detection events and are segmented in the processor into two histograms with bin lengths of $D_1$ and $D_2$. For each histogram the digital SPD output signal from every $D^{th}$ gate gets accumulated in one of the histogram bins over the measurement time $t_{hist}$. The histograms are re-ordered using the mapping $bin_{i,Q}=\mod(b \cdot N_Q, D_Q)$ where b is the original bin number (where b is in the set $\{0-(D--1)\}$) and i is the re-ordered bin number in the set $\{0-(D-1)\}$ so the bins represent equivalent time. This procedure effectively samples the detected signal at a temporal resolution of $1/(D_Q \cdot f_{l,Q})$ and allows the histogram to be read in equivalent time units, where a received optical pulse will occupy an equivalent time duration that is approximately the convolution of the temporal detection efficiency and the optical pulse width, or approximately a half width of $(\tau_p^2+\tau_G^2)$. The location of the center of the received pulse in equivalent time is related to the total time delay between transmitting and receiving the optical pulse. However, each histogram determines the temporal delay with a temporal ambiguity of $1/f_{l,Q}$, that is the actual temporal delay is known to modulo $(1/f_{l,Q})$, or equivalently to an unknown integer multiple of $1/f_{l,Q}$. If both pulse rates are sent to the same object then both histograms should produce the same total time delay, thus the actual temporal delay to the object and back can be found to an unambiguous temporal range that is much longer than $1/f_{l,Q}$ for all Q's. Typically the unambiguous temporal range will be determined to much better than $5/f_{l,Q}$, as improvements of such a magnitude are practically important enough to implement the scheme and are also easy to realize in practice.

The actual improvement in unambiguous temporal range can be many orders of magnitude. For instance, the object range r is determined by evaluating the $D_1$ histogram to $r_1 \approx \mod(r, R_1)$, where $R_1=c/(2 \cdot f_{l,1})$ is the unambiguous distance range associated with $f_{l,1}$ and the approximately equal sign accounts for measurement noise, while the object range is determined by evaluating the $D_2$ histogram to $r_2 \approx \mod(r, R_2)$, where $R_2=c/)2 \cdot f_{l,2})$ is the unambiguous range associated with $f_{l,2}$. The actual range to the object should be consistent with both pulse frequencies simultaneously so that $M_1 \cdot R_1 + r_1 - e_1 = M_2 \cdot R_2 + r_2 - e_2$ where $M_{1,2}$ are integers to be solved, for, and $e_{1,2}$ represent measurement errors. There are multiple solutions to this equation, and they occur periodically. For example, when $r_1=r_2=e_1=e_2=0$, the solutions are $M_1=N_1 \cdot D_2 \cdot K/G$ and $M_2=N_2 \cdot D_1 \cdot K/G$, where $G=ged(N_1 \cdot D_2, N_2 \cdot D_1)$ and K is any integer (ged stands for the greatest common denominator). So given $r_1$ and $r_2$, we can for instance restrict $0 \leq M_1 < N_1 \cdot D_2/G$ and $0 \leq M_2 < N_2 \cdot D_1/G$ so there is only one solution for the most likely $M_1$ and $M_2$ which can be found using any of various well-known methods such as the backwards Euclidean algorithm. This extends the measured unambiguous range to $R_{1,2}=D_1 \cdot D_2 \cdot c/(2 \cdot G \cdot f_g)$. In this example $R_1=1.37$ and $R_2=1.7$ m, while $R_{1,2}>163$ meters. Thus jointly processing the two pulse rates can lead to about a two order of magnitude improvement m the unambiguous range.

Typically the parameters are chosen so that $1/(D_Q \cdot f_Q) < 1.25 \cdot (\tau_{p,Q}^2+\tau_G^2)^{0.5}$ where ideally $\tau_p$ has a smooth intensity transition function. This constraint forces the temporal duration of the received pulse shape in the equivalent time histogram to have heightened count rates in at least three bins, in this example the pulsed optical sources 126, 150 can be realized by externally modulated CW lasers, where the modulator carves out a Gaussian-like pulse with a pulse width of $\tau_p \sim 200$ ps. Note that sharp transitions of the optical pulse like a square wave would be less desirable since the fitting or correlation function used to find the peak of the histogram would not have a slowly changing intensity transition to use to help locate the center of the received pulse. We can estimate a typical gate temporal detection window when gating the APD with a 1.25 GHz sinusoidal wave as $\tau_G \sim (1/6) \cdot (1/1.25 \times 10^9) \sim 133$ ps, where the (1/6) is an empirical factor. We see that $(\tau_p^2+\tau_G^2)^{0.5}=240$ ps. Thus the suggested design constraint is met for both pulse rates.

By re-arranging the histogram points accordingly a sampled version of the convolution of the gated detection efficiency and optical pulse function is created. By fitting the sampled convolution to a Gaussian or other representative fitting function we can find the temporal location of the return pulse (within an integer number of unambiguous ranges) with high accuracy and therefore the range to the object using the equation $\delta\tau=2 \cdot \delta d/c$, where c is the speed of light, $\delta d$ is the object displacement, and $\delta t$ is the measured temporal shift. The accuracy of the fitting will depend in part on the number of singles counts in the heightened histogram bins. In general the centroid of the fit can be determined to a temporal resolution much smaller than the separation between histogram bins, since 3 or more bins have an elevated count level and the resulting fit can be optimized on a much finer time-grid than the histogram bin resolution. Other methods of determining the delay with higher resolution than the bin spacing could be used, such as using a correlation-based technique. The delay information is extracted from the relative count rates in the histogram bins.

It is possible to simultaneously transmit pulses at Q distinct pulse rates where Q>1, and receive the signal with Z detectors where Z<Q. In our example we used Z=1 detector to measure Q=2 pulse rates.

Figure 3:
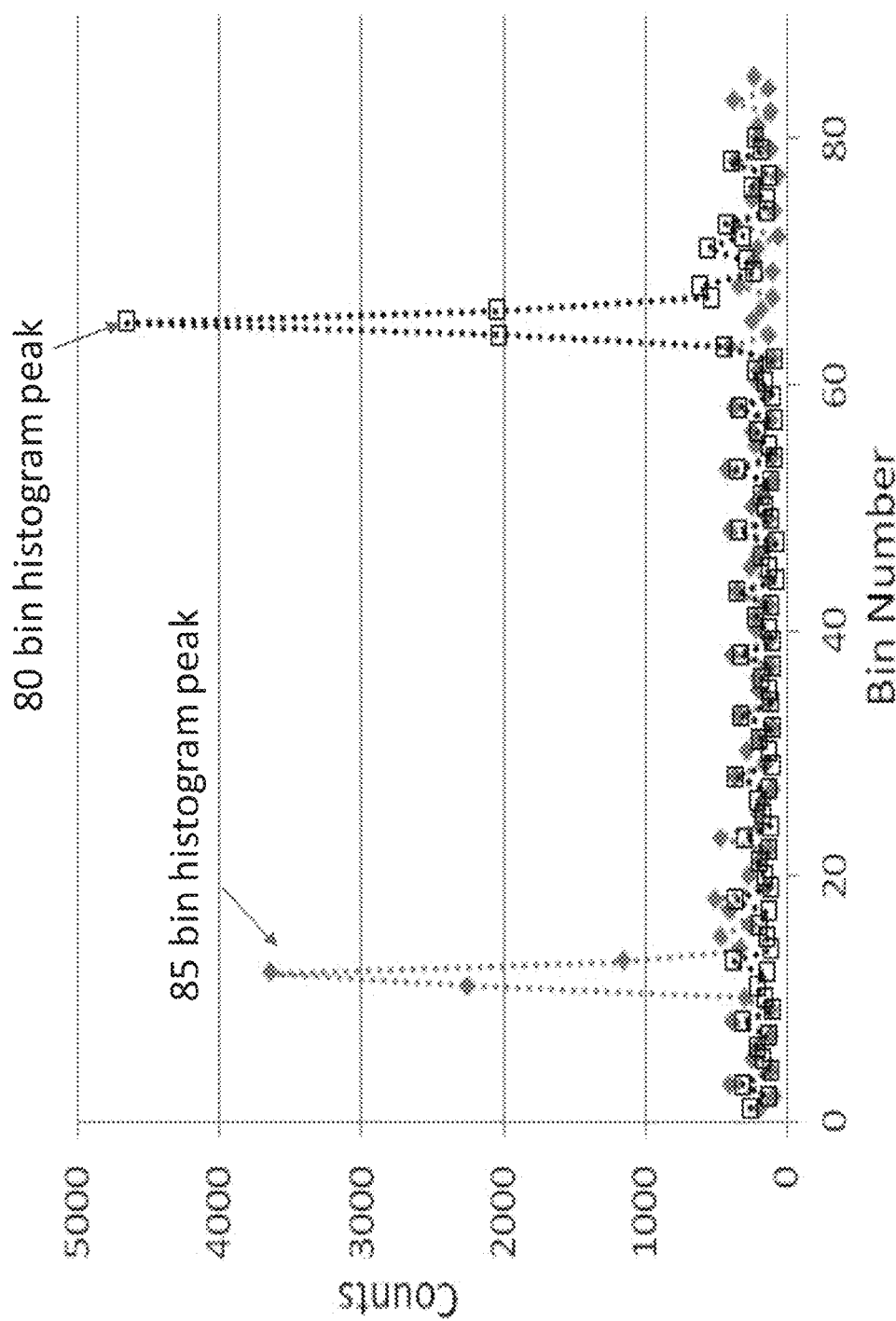
FIG. 3: Two histograms generated from the system of FIG. 2 where when the data is evaluated in an 85 bin histogram only the 88.2 MHz pulse rate reflection peak becomes apparent while when the data is evaluated in an 80 bin histogram only the 109.4 MHz pulse rate reflection peak becomes apparent.

FIG. 3 shows experimentally obtained data of re-ordered histograms taken under conditions similar to the example described herein. By parsing the data into 80 or 85 bin histograms we can observe that for one histogram length only a return pulse from one of the optical pulse rates is isolated while the counts due to the other optical pulse rate are roughly evenly distributed throughout the histogram bins, thus allowing the desired pulse to be observed. This concept allows de-multiplexing of multiple pulse rates simultaneously detected at the receiver. The technique can be extended to three or more pulse rates. Note that in FIG. 3 we see that the temporally reordered histogram bins before and after the bin with the highest count rate in the 80 bin histogram are nearly equal, indicating that the return pulse is located near the center of the bin with the highest count rate. However the 85 bin histogram has more counts in the bin to the left of the bin with the highest peak counts than it does in the bin to the right of the bin with the highest peak counts. This indicates the actual return pulse is located slightly to the left of the center of the bin with the peak count rate. The exact location of the return pulse can be determined to high resolution using a variety of techniques including curve fitting and correlation methods.

The embodiment of FIG. 2 can also be used to obtain spectral information about the path from the transmitter back to the receiver without spectral filtering. Here the optical pulse sources 126, 150 are of different wavelength and transmitted to a single location. After detection, signal processing can distinguish the relative probability a receiving each of the two wavelengths without requiring multiple detectors or the use of spectral filtering devices such as a tuneable optical filter. The results from the signal processing can be used to infer information about the spectral characteristics of the path between the transmitter and receiver, including the spectral properties of the reflection from the target. If desired, a bypass switch 154 can be used to bypass the normal transmit path and instead send the optical signal directly to the receiver, optionally through a fixed attenuator. The calibration determines the relative count rates of the two different wavelengths (at different optical pulse repetition rates) when there is no wavelength dependent loss in the system. The actual measurement taken when the by-pass switch allows the signal to propagate to the object and back can have wavelength dependent loss. The wavelength dependent loss can then be determined by comparing the actual measurement to the calibration measurement, thus calibrating out effects such as changes in the output power levels of the two optical pulsed sources 126, 150 or differences in extinction ratio of the two pulsed optical sources 126, 160 and therefore allowing for a more accurate measurement.

Figure 4:
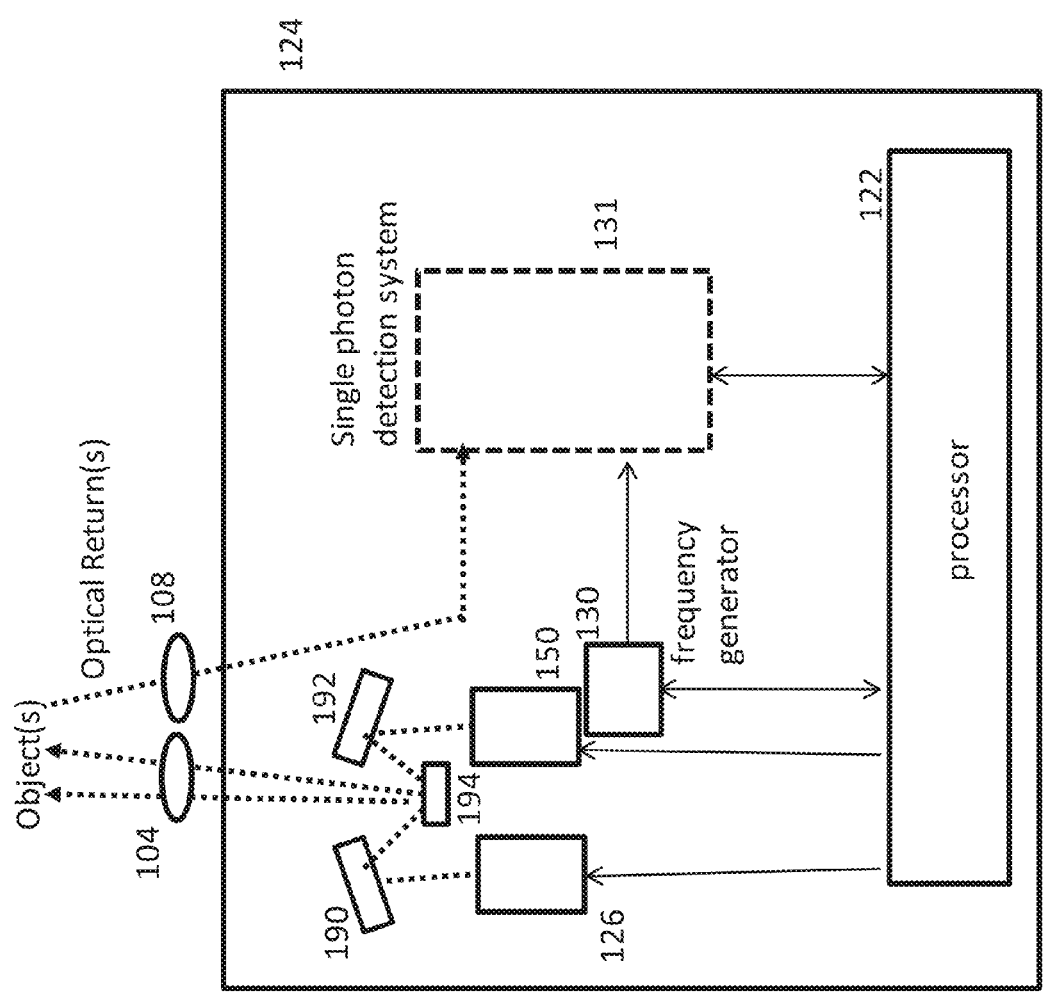
FIG. 4: Pulsed gated lidar system with separate steering mirrors 190, 192 for each pulse rate so as to measure the distance to two distinct locations.

FIG. 4 shows an embodiment where the direction that the two pulsed optical sources are transmitted can be independently controlled with two steering mirrors 190, 192 and one fixed mirror 194. Other methods of controlling the location of the multiple beams could also be used, such as using a different transmit aperture for each beam or placing an array of laser beams near the aperture lens 104 and using the aperture lens to image the array at the object, thereby creating multiple distinct laser spots at different spatial positions at the object location. It is not required that the multiple distinct laser spots have different wavelengths, but regardless of their wavelength they can be independently measured since they are pulsed at different repetition rates and therefore can be isolated in post-processing as as previously described. The pulse rates are chosen using the same design rules as described previously, which allows both pulse rates to be independently evaluated even when they are transmitted simultaneously.

In the embodiment of FIG. 4 the range to two different points (two different objects or two different locations on the same object) can be simultaneously measured using one SPD. If the optical pulse rates are fixed then each pulse will have the natural unambiguous range of $0.5 \cdot 3 \times 10^8$ m/s/$f_{i,Q}$, however this range could be improved using a number of techniques including using multiple but different fixed pulse rates at each location (using the design rules for multiple pulse rates previously described) or by using other methods such as adding a pulse pattern to the pulse streams. The ability to measure the distance to multiple points simultaneously is useful to speed up imaging or for tracking multiple objects, while the capability to measure these multiple points using just one detector, or at least fewer detectors than the multiple spatial points being measured, is of practical benefit.

Figure 5:
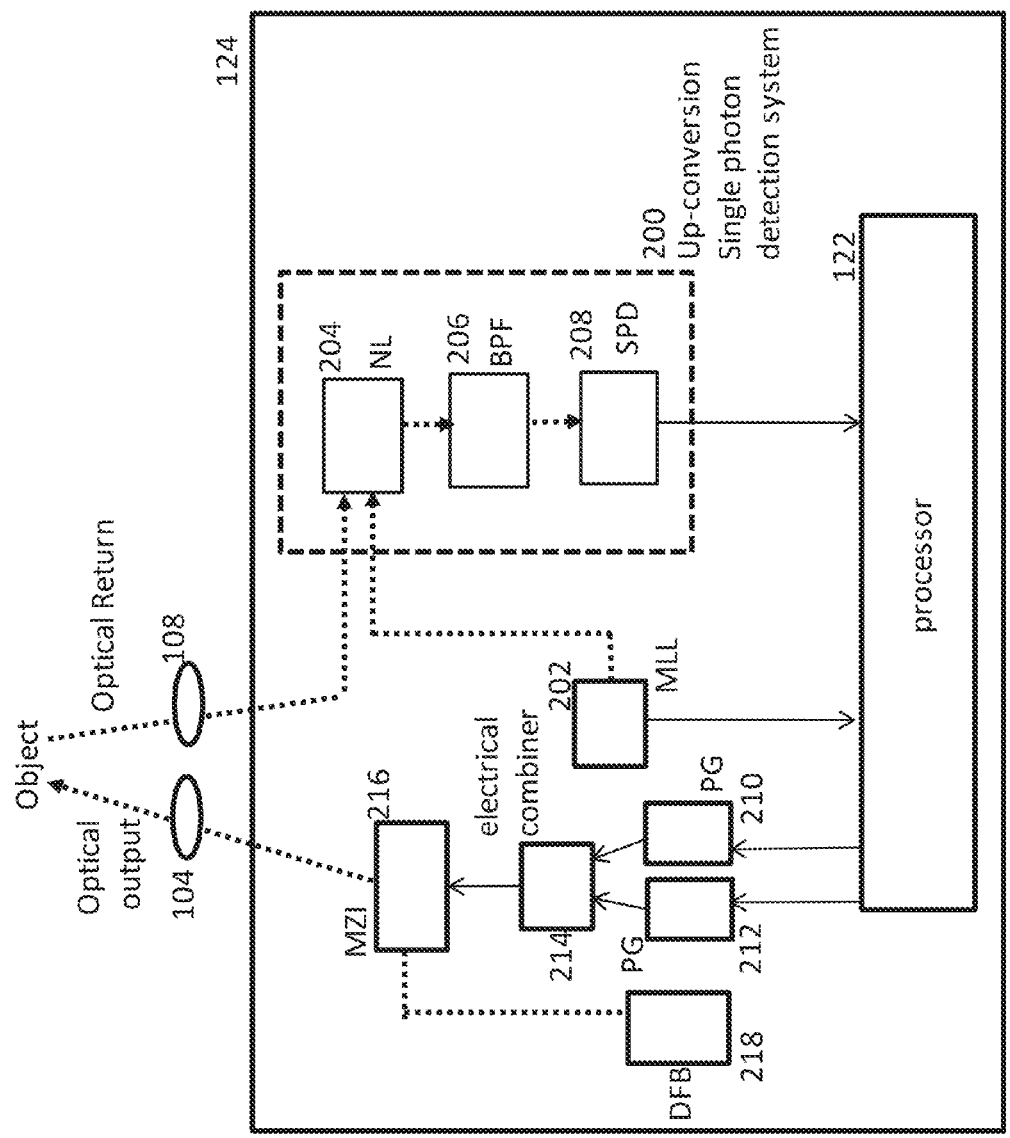
FIG. 5: Pulsed gated lidar system using an upconversion single photon detection system 200, which is time-gated by a mode-looked pump laser 202.

The embodiment of FIG. 5 temporally gates the return signal using an up-conversion single photon detection system 200. The gate frequency $f_g$ is set by the repetition rate of a pump mode locked laser (MLL) 202, and the temporal gate width $\tau_G$ is determined by the pulse-width of the MLL laser pulses. The MLL has an optical wavelength of $\lambda_{MLL}$, which can be 1550 nm. Any type of pump laser could be used, with a MLL being a good choice since very narrow pulse-widths are easily attainable. Here we assume a 10 ps pulse width and a $f_g$=2.5 GHz repetition rate. The narrow pulse width helps to isolate the location of the received pulse with fine resolution. An electrical clock from the MLL is sent to the processor 122 which has clock control circuitry to generate two frequencies derived from the MLL electrical clock which are sent to short electrical pulse generators 210, 212 to generate electrical, pulses at specific frequencies of $f_{i,1}=f_g \cdot 59/69$ and $f_{i,2}=f_g \cdot 57/71$, or about 2.14 and 2.01 GHz, respectively. That is, $N_1$=59, $D_1$=69, $N_2$=57, $D_2$=71. The pulses from the pulse generators are combined in an electrical combiner 214 and the output of the electrical combiner is used as the electrical, modulation signal to a Mach-Zehnder Interferometer (MZI) 216 optical modulator. A CW laser 218 such as a DFB laser is the optical input to the MZI. The optical signal is modulated by the MZI to generate optical pulses at both $f_{i,1}$ and $f_{i,2}$ at the same optical wavelength, for instance $\lambda_{signal}$=1310 nm. Thus both optical pulse rates are nonlinearly frequency converted to the sum wavelength in the up-conversion stage. The optical pulses out of the MZI modulator 216 might have a 25 ps pulse width.

The optical return pulses from the target are collected by the receive antenna 108, and sent to the up-conversion SPD system 200. The up-conversion SPD system has a nonlinear (NL) up-conversion crystal 204 such as a periodically poled lithium niobate (PPLN) waveguide. The pulses from the MLL 202 serve as the pump pulses to the NL crystal 204. The NL crystal is phase matched so that the strong MLL pulses interact with the weak return signal pulses to up-convert the signal pulses that are temporally coincident with the pump pulses to a new sum frequency wavelength of $1/\lambda_{SFG}=1/\lambda_{MLL}+1/\lambda_{signal}$, or $\lambda_{SFG}\sim 710$ nm. An optical band pass filter (BPF) 206 passes only the up-converted light at to as $\lambda_{SFG}$ to a SPD sensitive to 710 nm, such as an ungated Si APD based SPD, which detects the upconverted photons. The power of the MLL pump pulses is chosen so as to convert the incoming signal pulses with high conversion efficiency. The system functions similarly as the design of FIG. 2, but now $(\tau_p^2+\tau_G^2)^{0.5}=27$ ps, which is nearly an order of magnitude shorter than the example embodiment of FIG. 2. The repetition rate of the optical pulses are also much higher, which leads to a short equivalent time spacing between bins of about 7 ps. Thus the shorter gate duration allowed by the up-conversion stage has been used to increase the temporal resolution, and therefore the same number of measured photon counts will lead to a more exact temporal localization of the delay measurement.

In any system a certain signal to noise ratio (SNR) is required for operation. We could loosely define SNR as the ratio of the square root of the number of counts at the peak of the histogram to the square root of the number of counts in histogram bins that are not coincident with a received optical pulse, although other definitions can be made and used as appropriate. If there is not a high enough SNR then the processing performed to find the range and/or velocity to an object will not produce a meaningful answer. Processing can consume a significant amount of resources, such as electrical power or processing time. The data can thus be analyzed in a cursory way to determine if further processing is warranted, and further processing can be aborted if it is unlikely to succeed thereby conserving processing power. One simple method of estimating the SNR can compare the average number of photon counts recorded during the three consecutive histogram bins in the temporally re-ordered histogram that have the highest total count level, to the average number of photon counts all other histogram bins. If the corresponding SNR during a measurement time of $t_{hist}$ is too low, then as appropriate either $t_{hist}$ can be lengthened prior to processing (for instance by combining data from neighboring measurement times before processing) or the processing could be aborted, depending on the user needs.

Figure 6:
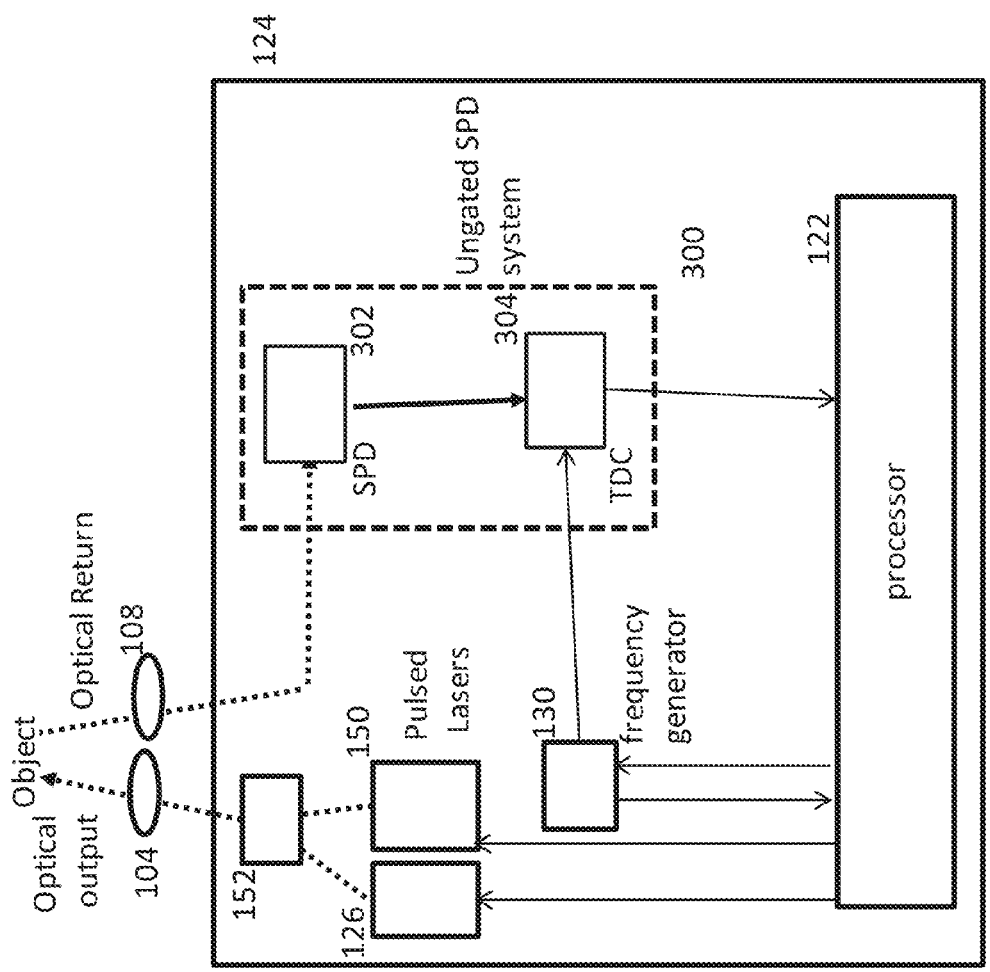
FIG. 6: Lidar system with multiple distinct optical pulse rates, where each pulse rate is discernable by post-processing the output of single ungated SPD system 300.

The embodiment of FIG. 6 depicts a system that uses an ungated SPD to detect multiple optical pulse rates and subsequently improve the unambiguous detection range via signal processing. The system is analogous to the embodiment of FIG. 2 with a similar numbering scheme. As in FIG. 2 the system transmits two pulsed optical signals from pulsed optical sources 126, 150 at a pulse frequency $f_{l,1}=109.4$ MHz, $D_1=80$, $N_1=7$, $f_{l,2}=88.2$ MHz, $D_2=85$ bins, $N_2=6$. We see that $N_Q/(D_Q \cdot f_{l,Q})=C=800$ ps for all Q, where $N_Q$ and $D_Q$ are relatively prime numbers, C is a constant, and $D_j \neq D_Q$ for $j \neq Q$. The ungated SPD system 300 contains an ungated SPD 302, the output of the SPD being time-stamped by a time-to-digital convener (TDC) 304 which sends the digitized temporal location of a SPD detection event to the DSP. The TDC records the amount of time that elapses after a trigger from the frequency generator 130 to the SPD detection event. The frequency generator generates a clock frequency of $1/C=1.25$ GHz. The processor keeps track of the TDC time stamp and the associated number of clocks that have been generated from frequency generator. This method keeps the number of bits generated by the TDC to some small value, such as just 4 bits which leads to $800/2^4=50$ ps of TDC resolution, while still allowing the actual temporal location of the detection event to be tracked over arbitrary measurement periods. The processor bins the resulting detection events into two histograms, the two histograms each having a temporal duration of $T_{hist,q}=1/f_{l,Q}$ and $D_Q$ number of bins, where $Q=\{1,2\}$. Thus each histogram has a bin temporal resolution of $T_{hist,q}/D_Q$. The resolution of the TDC should allow for such a bin resolution, for instance by having a temporal resolution $<0.5/(D_Q \cdot f_{l,Q})$ for $Q=\{1,2\}$. This allows for the breakdowns from the SPD to be parsed into the correct, bin with high probability. The 50 ps TDC resolution is thus sufficient, although a higher temporal resolution makes the parsing of the breakdown events into histogram bins yet more accurate. As in previous embodiments, the use of two (or more) histograms to separate out two (or more) received pulse rates allows for the extension of the unambiguous range beyond $1/f_{l,Q}$. Note that both optical pulse rates can be transmitted simultaneously, even though there is only one SPD, due to the design of the invention. The unambiguous range extension is typically designed to lead to at least a factor of 5 extension in range.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this.

What is claimed is:

1. An apparatus for measuring temporal delays of Q pulsed optical signals where $Q \geq 2$ and each pulsed optical signal is of a different pulse rate, comprising:
   a transmitter that transmits at least two optical signals with pulse frequencies $f_1$ and $f_2$ at towards a receiver;
   the receiver receives the at least two optical signals;
   the receiver contains at least one single-photon detector (SPD) with a gated optical detection efficiency that is modulated at a gate frequency $f_G$ where the gate frequency is the following: $f_1/f_G=(N_1/D_1)$ and $f_2/f_G=N_2/D_2$, that $N_1$ and $D_1$ are relatively prime numbers and $N_2$ and $D_2$ are relatively prime numbers and $D_1 \neq D_2$;
   an output of the SPD being sent to a digital signal processor (DSP) which processes the SPD output signal, the DSP jointly processing at least two pulsed optical signals to measure at least two temporal delays.

2. The apparatus of claim 1, wherein the DSP processing at least two pulsed optical signals comprises: binning data into at least two histograms of differing bin lengths, where a first histogram of bin-length $D_1$ is used to evaluate the pulse rate at $f_1$ and a second histogram of bin-length $D_2$ is used to evaluate the pulse rate at $f_2$, where each of the histograms is able to determine a temporal delay range to an unambiguous temporal delay range of $1/f_1$ and $1/f_2$ correspondingly, the data from at least two pulse rates being jointly processed to increase the unambiguous temporal delay range to a value $>5/f_Q$ for any Q number of signals, where $f_Q$ is a pulse frequency of the Q-th signal, the unambiguous temporal delay range being extended by determining a range value that gives a consistent result for the multiple pulse rates.

3. The apparatus of claim 2, wherein for at least two of the Q pulse rates an optical pulse width is chosen so that when the SPD is illuminated by the optical pulse at rate $f_Q$ then the histogram with $D_Q$ bins has at least three bins with count levels elevated above a background count level, whereas the elevated count levels in the three or more bins allow for a determination of the temporal delay with a resolution less than $1/(D_Q \cdot f_Q)$ for all Q, where $1/(D_Q \cdot f_Q)$ is a temporal separation between histogram bins.

4. The apparatus of claim 3, wherein a temporal half-width of the gated detection efficiency is $\tau_G$ and a temporal half-width of the optical pulses are $\tau_{p,Q}$ and for at least two of the Q pulse rates parameters are chosen so that $1/(D_Q \cdot f_Q) < 1.25 \cdot (\tau_{p,Q}^2 + \tau_G^2)^{0.5}$, thereby forcing the received signal to occupy a temporal duration long enough to elevate the count rate in 3 or more of the histogram bins.

5. The apparatus of claim 2, whereas a temporal delay measurement at a given optical pulse rate is adjusted based on the received single photon count rate in the histogram bins that are elevated above a background level, the adjustment accounting for changes in a perceived temporal delay caused by detector saturation.

6. The apparatus of claim 2, wherein the transmitter generates at least two different optical wavelengths signals, and wherein at least two of the Q optical signal pulse repetition frequencies are modulated onto different optical wavelengths signals, these optical signals are transmitted through a single optical path to the receiver, a relative magnitude of the histogram counts in each of the Q histograms of $D_Q$ bins being used to determine an information about spectral characteristics of an optical path between the transmitter and the receiver.

7. The apparatus of claim 1, wherein the DSP processing of the Q pulsed optical signals comprises: binning the data into histograms of differing bin lengths, where a histogram of bin-length $D_Q$ is used to evaluate the pulse rate at $f_Q$, and whereas at least two of the Q pulse rates are transmitted simultaneously; the different histogram bin lengths allow a single SPD to isolate multiple simultaneously received pulsed optical signals of different pulse rate.

8. The apparatus of claim 7, whereas a histogram of bin-length of $D_2$ has approximately equally distributed counts in all its bins from an input pulse rate of $f_1$.

9. The apparatus of claim 7, whereas the histogram bins are re-ordered using a mapping $bin_i = mod(b \cdot N_Q, D_Q)$ where b is an original bin number (b is in the set $\{0, (D_Q-1)\}$) and i is a re-ordered bin number in a set $\{0, (D_Q-1)\}$, the re-ordered histogram being an equivalent time histogram with a temporal separation between its bins of $1/(D_Q \cdot f_Q)$ a temporal location of the optical delay being determined to a temporal resolution $<1/(D_Q \cdot f_Q)$ by evaluating a relative counts of the re-ordered histogram bins.

10. The apparatus of claim 1, wherein the transmitter segments a transmission into two or more temporal segments, whereas some subset of at least two pulsed signals are transmitted during each temporal segment, thereby temporally multiplexing the pulsed signals in order to allow the DSP to more easily isolate the pulsed signals with low interference.

11. The apparatus of claim 1, whereas the transmitter transmits the pulsed optical signals to two or more different spatial locations, the temporal delay being measured to each of the spatial locations, whereas at least two pulsed optical signals are transmitted in a different direction so that at least one unique pulse rate illuminates each spatial location.

12. The apparatus of claim 1, comprising: the DSP employing an adaptive method to determine a measurement interval over which to process data based on the received SPD count statistics, including an option of stopping further data processing if the received signal does not have enough counts to allow for a precise measurement, the processing being terminated in order to conserve power consumption and processing time.

13. The apparatus of claim 12, wherein an optical switch is installed before the transmitter, the switch diverts the signal directly to the receiver thereby following a known optical path, and whereas measurements of the optical signal taken over the known optical path are used for calibrating the apparatus.

14. The apparatus of claim 1, wherein the gated detection efficiency is realized using optical pump pulses to control a frequency conversion efficiency of a nonlinear interaction, the resulting nonlinearly converted signal pulses being detected with one or more single photon detectors.

15. An apparatus for measuring temporal delays of Q pulsed optical signals where Q>2 and each pulsed optical signal is of a different pulse rate, comprising:
  a transmitter that transmits at least two optical signals with pulse frequencies $f_1$ and $f_2$ towards a receiver;
  the receiver that contains at least one single-photon detector (SPD), whereas an output of the SPD is sent to a digital signal processor (DSP);
  the DSP processing the SPD output into at least two histograms of distinct temporal durations $T_1 = 1/f_1$ and $T_2 = 1/f_2$, having histogram bin resolutions of $T_1/D_1$ and $T_2/D_2$, and where $C = N_1/(D_1 \cdot f_1) = N_2/(D_2 \cdot f_2)$, where $N_1$ and $D_1$ are relatively prime numbers and $N_2$ and $D_2$ are relatively prime numbers, $D_1 \neq D_2$, and C is a constant;
  the DSP uses at least two histograms to determine the temporal delay of the optical signals, whereas each histogram can independently find the temporal delay to an unambiguous time delay range of $T_1$ and $T_2$, but an effective unambiguous temporal delay range being extended by determining a range value that gives a consistent result for Q pulse rates such that a new unambiguous range is $>5/f_{Qmin}$ where $f_{Qmin}$ is the minimum pulse repetition frequency of the Q pulsed optical signals.

16. The apparatus of claim 15, where at least two of the Q pulse rates are transmitted simultaneously, and the different histogram durations allow a single SPD to isolate multiple simultaneously received pulsed optical signals of different pulse rate.

17. The apparatus of claim 15, whereas the transmitter transmits pulsed optical signals to two or more different spatial locations, the temporal delay being measured to each of the spatial locations, whereas at least two of the Q pulsed optical signals are transmitted in a different spatial direction so that at least one unique pulse rate illuminates each spatial location.

18. A method for measuring temporal delays of Q pulsed optical signals where Q>2 and each pulsed optical signal is of a different pulse rate, comprising:
  transmitting at least two optical signals with pulse frequencies $f_1$ and $f_2$;
  detecting a time-delayed pulsed optical signal by temporally-gating a detection efficiency of a single-photon detector (SPD) at a gate frequency $f_G$ where $f_1/f_G = (N_1/D_1)$ and $f_2/f_G = N_2/D_2$, where $N_1$ and $D_1$ are relatively prime numbers and $N_2$ and $D_2$ are relatively prime numbers and $D_1 \neq D_2$;
  and processing an output of the SPD using a digital signal processor (DSP) to measure the temporal delay.

19. The method of claim 18, whereas the temporally-gated SPD is gated by using an optical pump pulse to control a temporal conversion efficiency of a nonlinear frequency conversion process.

20. The method of claim 18, whereas at least two of the pulsed optical signals are transmitted simultaneously and received by a single SPD.

\* \* \* \* \*